Figure 1:
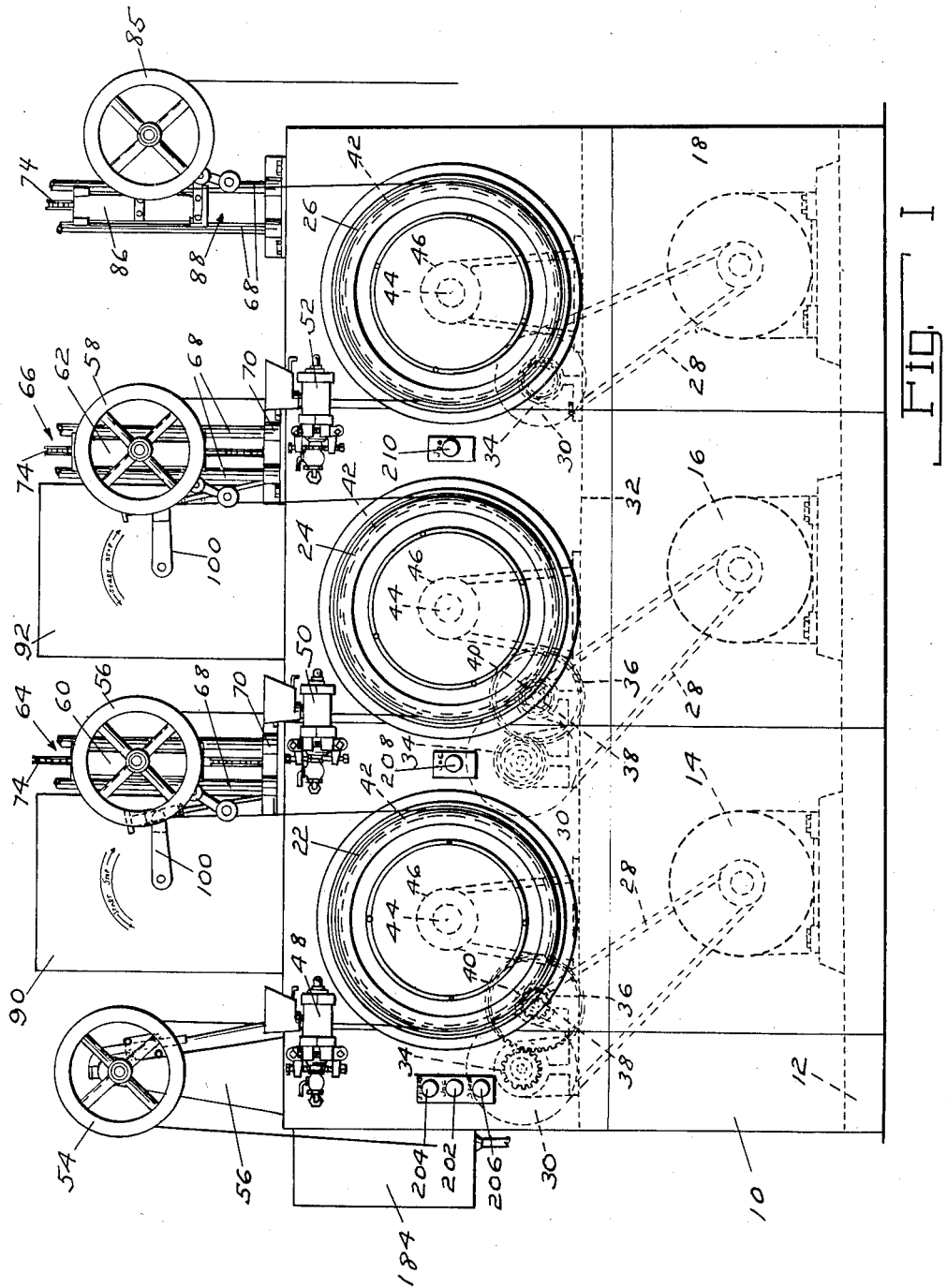

April 4, 1939.　　　R. E. KOONTZ　　　2,153,192
CONTROL CIRCUIT
Filed Sept. 25, 1937　　　2 Sheets-Sheet 1

INVENTOR.
BY *Richard E. Koontz*
*McConkey Dawson & Booth*
ATTORNEYS.

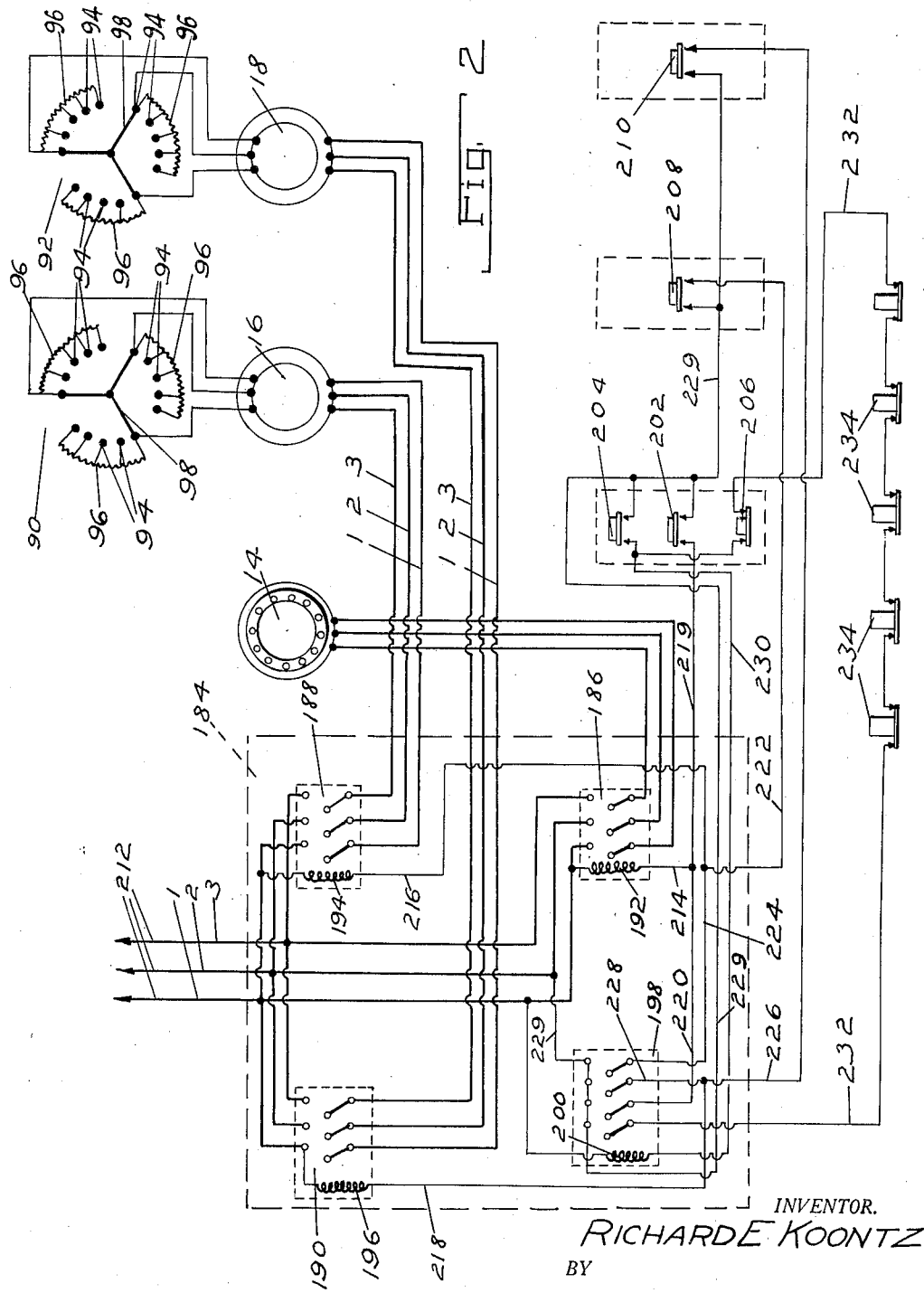

Patented Apr. 4, 1939

2,153,192

UNITED STATES PATENT OFFICE 2,153,192

CONTROL CIRCUIT

Richard E. Koontz, Niles, Mich., assignor to National Standard Company, Niles, Mich., a corporation of Michigan Application September 25, 1937, Serial No. 165,621

2 Claims. (Cl. 172—239)

This invention relates to control circuits for wire-drawing and similar machines. An object of the invention is to provide simple and effective control means for a machine operating in successive stages, or made up of a series of units.

It is particularly desirable to be able to operate the units individually, for example in threading the wire through the machine, while retaining a single control for ordinary use and to include in the motor circuits, arranged to permit this, individual adjustments for independently varying the speed of the several motors driving the units. It is also desirable to arrange the circuit so that actuation of any one of a plurality of safety devices will stop the entire machine.

The above and other objects and novel features of the invention will be apparent from the following description of the illustrative embodiment shown in the accompanying drawings, in which:

Figure 1 is a side elevation of a machine of the type to be controlled by the novel control circuit; and Figure 2 is a wiring diagram of the novel control circuit.

A machine of the type to be controlled by applicant's novel control circuit is described below. This machine is claimed and more completely described in the copending application of Robert C. Pierce, Serial No. 150,476, filed June 26, 1937.

Figure 1 illustrates a wire drawing machine in which the wire is passed successively through three dies. Such a machine as is illustrated is called a "three pass" machine and may be considered as consisting of three units mounted on a frame 10 which may be built up of standard structural steel shapes and plates welded together to form suitable supports for the various mechanisms.

The frame 10 is arranged to provide a lower platform 12 upon which are mounted three motors 14, 16 and 18, the motor 14 in this particular machine being a constant speed alternating current motor, e. g., a squirrel cage induction motor; and the motors 16 and 18 being variable speed alternating current motors, preferably phase wound rotor induction motors.

These motors drive three capstan wheels 22, 24 and 26 arranged in a horizontal line along the machine and in a vertical plane. The driving means between the motors and capstans consists of belts 28 driving pulleys 30 journalled in blocks on a second platform 32 provided by the frame 10, the pulleys 30 being connected by suitable gearing to drive the capstan wheels at the desired speed.

In the first two units of the illustrated machine this gearing comprises pinions 34 mounted on the same shafts with the pulleys 30, driving gears 36 on layshaft 38 carrying additional pinions 40 which drive large gears 42 secured on shafts 44 on which the capstan wheels are mounted. The shafts 44 are journalled in blocks 46 attached to the platform 32.

In the third unit, due to the fact that each capstan must run at an average higher speed than the preceding one, one set of gears e. g. gear 36, its layshaft 38 and pinion 40, is eliminated and the pinion 34 drives the large gear 42 directly.

Each of the capstans has associated therewith a die holder 48, 50 or 52 respectively, each containing a die (not shown) positioned with its center in the line of a vertical tangent to the left hand side of the periphery of the respective capstan. The capstans rotate counterclockwise so as to draw the wire vertically downward through the dies.

Wire is fed to the die in holder 48 from a guide sheave 54 rotatably mounted on a fixed bracket 56 attached to the top of the frame 10 in such a position that the wire leaves the sheaves 54 in line with the die and capstan periphery. Suitable means (not shown) for supplying wire to the guide sheave are provided.

Wire passes from the capstan 22 to the capstan 24 and from the capstan 24 to the capstan 26 over guide sheaves 56 and 58 respectively rotatably mounted on slides 60 and 62 vertically movable on guides 64 and 66. These guides are shown as formed of two cylindrical rods 68 secured at their lower ends in brackets 70 bolted to the top of the frame 10. The slides 60 and 62 are disposed between the pairs of rods and are formed with lugs having oppositely outwardly directed semi-circular grooves fitting around the rods.

In order to tension the wire as it enters the die, sprocket chains 74 are secured to the top of each slide. These chains pass over weighted sprockets as described and claimed in the copending application of Robert C. Pierce, Serial No. 68,856 filed March 14, 1936.

Another guide pulley 85, swingably mounted on a slide 86, slidable in a guide 88, is positioned to receive wire from the capstan 26 and feed it under tension to a windup reel (not shown). The movements of this slide may be utilized to control the speed of the windup reel.

An important feature of this machine resides in the means for controlling the speed of the motors 16 and 18 so as to maintain the wire tight and pass it on through each unit as rapidly as it leaves the preceding one while at the same time giving it a constant back pull.

To accomplish this the two variable speed motors 16 and 18 are respectively provided with rheostats 90 and 92 of any standard type shown diagrammatically in Figure 2 as each comprising in the case of three phase motor, three sets of contact points 94 arranged in arc of a common circle and tapping successive portions of three resistances 96. To one end of each of the resistances is connected one phase lead of the wound rotor of the respective motor, and a three armed movable contactor 94 pivoted on the center of the above mentioned common circle serves to connect the phase leads in Y, and upon rotation to simultaneously introduce or take out resistances 96 in each phase. The mechanism for rotating the contactor (not shown herein) is claimed in the first above-mentioned Pierce application.

It will be understood that in the actual rheostat the contacts are so closely arranged or the contactor arms are so broad that they engage the next contact before disengaging the first one so that the rotor circuits are closed at all times.

The rheostats 90 and 92 with their associated operating levers 100 are shown in Fig. 1 mounted on the upper part of the machine frame just to the left of the guides 64 and 66 respectively.

A switch box 184 is mounted on the machine in any desired position, this box containing for a three pass machine, four automatic switches three of which, designated respectively 186, 188, and 190, are single throw three pole switches operated respectively by solenoids 192, 194 and 196, and the fourth of which is a single throw 4 pole switch 198 operated by a solenoid 200.

Adjacent the first unit of the machine are positioned a jog button 202 for turning over the first unit separately, a start button 204 for starting the whole machine together and a stop button 206 for stopping the whole machine. Jog buttons 208 and 210 are provided adjacent the two succeeding units for turning them over individually.

A three phase power line 212 is conducted to the switch box 184 the three wires of which may be designated 1, 2 and 3. Each of these wires is divided three ways and connected to the contacts of the switches 186, 188 and 190.

The power lines from the motors 14, 16 and 18 are connected respectively to the poles of the switches 186, 188 and 190. Thus closing any of these switches starts the corresponding motor. The solenoids of all the switches have one terminal connected to phase wire 1. The other terminals are connected to leads 214, 216 and 218 each of which divide into parallel circuits 219 and 220, 222 and 224, 226 and 228 respectively. Circuits 219, 222 and 226 are respectively connected to one contact of the push buttons 202, 208, and 210. The other contacts of these push buttons are connected to lead 2 of the power line by a wire 229 which also connects all four contacts of the switch 198 to lead 2. Circuits 220, 224 and 228 are each connected to a pole of the switch 198.

Solenoid 200 is also connected to phase lead 1 and its other terminal is connected to a line 230 which extends to one contact of the start button 204 the other contact being connected through wire 229 to lead 2. Shunted around the start button 204 is a circuit 232 containing the stop button 206 and a series of limit switches 234. The circuit 232 is connected to the remaining pole of the switch 198. It should be noted that the jog and start buttons are make switches and the stop button and limit switches are break switches, the limit switches are placed in many positions around the machine and arranged to be operated by many contingencies such as wire breakage, tangling, etc.

The operation of the circuit is as follows. In threading the machine it is desirable to operate any one of the motors 14, 16 or 18 individually. This is done by pushing and holding the respective jog button 202, 208 or 210 positioned by that motor to energize the solenoid 192, 194 or 196 to close the respective switch 186, 188, 190. For example, upon pushing and holding the jog button 202 a circuit is closed from line 1 of the circuit wires 212, through solenoid 192 of switch 186 (thereby causing the closing of the switch), through lines 214 and 219 and jog button 202, to line 229 and thence to line 2 of circuit wires 212. So long as the button 202 is held, the switch 186 remains closed and the motor 14 runs. Upon releasing the button the motor stops. Similarly, the closing of jog button 208 closes the switch 188 to cause the motor 16 to run, and the closing of jog button 210 closes the switch 190 to cause the motor 18 to run. In threading the wire through each first two units of the machine, the motor 14 or 16 is run long enough to draw through the die of that unit enough wire to thread through the succeeding unit or units of the machine. With the machine threaded, the start button 204 is pushed energizing the solenoid 200 and closing the switch 198. This in turn energizes all of the solenoids 192, 194 and 196 and closes all the switches 186, 188 and 190 to start all the motors simultaneously.

The circuit 232 is closed by the switch 198 to constitute a holding circuit for that switch so that the motors continue to run upon release of the start button. But upon opening circuit 232 by pushing the stop button 206 or any of the limit switches all the motors stop.

While one particular arrangement of wiring has been described in detail, it is not my intention to limit the scope of the invention to that exact arrangement, or otherwise than by the terms of the appended claims.

I claim:

1. A control circuit for a plurality of variable speed alternating current motors comprising independently adjustable rheostats connected to and controlling the speed of said motors respectively, power lines, switches for connecting said motors with their rheostats individually to the power lines, a solenoid for operating each switch, a manually-operable device corresponding to each motor for closing a circuit between two of the power lines through the solenoid of the switch for that motor for individually energizing said motors, a manually-operable multiple switch for closing circuits between two of the power lines through all of said solenoids to start all of said motors, a holding circuit closed by actuation of said multiple switch for holding said multiple switch in closed position, and means for breaking the holding circuit and thereby opening the multiple switch and breaking all of the solenoid circuits.

2. A control circuit for a plurality of motors comprising power lines, switches for connecting said motors individually to the power lines, a solenoid for operating each switch, means for holding a circuit closed between two of the power lines through each of the solenoids for individually energizing said motors, a multiple switch for closing circuits between two of said power lines simultaneously through all of said solenoids to start all of said motors, a holding circuit closed by actuation of said multiple switch for holding said multiple switch in closed position, and means for breaking the holding circuit and thereby opening the multiple switch and breaking all of the solenoid circuits.

RICHARD E. KOONTZ.